(12) United States Patent
Cheng

(10) Patent No.: US 7,671,842 B2
(45) Date of Patent: *Mar. 2, 2010

(54) DUAL MODE INPUT DEVICE

(76) Inventor: Yu-Chih Cheng, 2Fl. No. 23, Lane 136, Kangle St., Neihu Chiu, Taipei (TW) 114

( * ) Notice: Subject to any disclaimer, the term of this patent is extended or adjusted under 35 U.S.C. 154(b) by 689 days.

This patent is subject to a terminal disclaimer.

(21) Appl. No.: 11/550,612

(22) Filed: Oct. 18, 2006

(65) Prior Publication Data

US 2007/0120825 A1    May 31, 2007

Related U.S. Application Data

(63) Continuation of application No. 10/666,606, filed on Sep. 17, 2003, now Pat. No. 7,167,160.

(30) Foreign Application Priority Data

Jan. 6, 2003    (CN)    ................. 03 1 01015

(51) Int. Cl.
*G06F 3/033* (2006.01)
(52) U.S. Cl. ..................................... 345/163
(58) Field of Classification Search ......... 345/156–157, 345/163, 165–168
See application file for complete search history.

(56) References Cited

U.S. PATENT DOCUMENTS

| 5,280,276 | A | * | 1/1994 | Kwok ......................... 345/167 |
| 5,448,023 | A | | 9/1995 | Tooi |
| 6,580,420 | B1 | | 6/2003 | Wang |
| 6,762,751 | B2 | | 7/2004 | Kuan |
| 7,358,963 | B2 | * | 4/2008 | Low et al. .................... 345/175 |
| 2004/0095322 | A1 | | 5/2004 | Sun et al. |

FOREIGN PATENT DOCUMENTS

| CN | 2456225 Y | 10/2001 |
| CN | 2518155 Y | 10/2002 |

* cited by examiner

*Primary Examiner*—Richard Hjerpe
*Assistant Examiner*—Kimnhung Nguyen
(74) *Attorney, Agent, or Firm*—Workman Nydegger

(57) ABSTRACT

A dual mode input device, e.g. an optical mouse, is capable of performing data input function by moving the input device. Alternatively, the dual mode input device can also be an optical trackball. By turning the dual mode input device upside down, a trackball can be mounted to or exposed from the bottom surface to perform data input function by manipulating the trackball so that no movement of the input device is required.

28 Claims, 7 Drawing Sheets

DUAL MODE INPUT DEVICE

This application is a continuation of U.S. patent application Ser. No. 10/666,606 filed Sep. 17, 2003 now U.S. Pat. No. 7,167,160.

FIELD OF THE INVENTION

The present invention relates to an input device and more particularly to a dual mode input device functioning as either an optical mouse or an optical trackball.

BACKGROUND OF THE INVENTION

A conventional optical mouse, which inputs data either via radio frequency (RF) or via cable, is illustrated as FIGS. 1A and 1B. FIGS. 1A and 1B show the top and bottom perspective views of the conventional optical mouse 10. The optical mouse 10 includes an upper housing 11, a lower housing 12 and a roller 13. A photo-sensor window 121 is provided in the lower housing 12. A photo-sensor circuit (not shown) is accommodated in the space formed by the combination of the upper and the lower housings 11 and 12 at a position near the photo-sensor window 121. When the optical mouse 10 is placed on a certain plane, the photo-sensor circuit detects the texture variation of the certain plane, and generates a cursor indication signal accordingly.

In practice, however, it is sometimes difficult to find a suitable plane for placing and operating the optical mouse. For example, presentation work particularly suffers from such problem. Therefore, it is preferred that an alternative operation mode requiring no working plane can be provided to solve this problem.

SUMMARY OF THE INVENTION

Therefore, an object of the present invention is to provide a dual mode input device capable of performing data input function by moving the input device, or performing data input function by manipulating an element without movement of the input device.

According to a first aspect of the present invention, a dual mode input device performs data input function by a moving action in a first mode, and performs data input function by a manipulating operation on an input element in a second mode. The input device comprises a main body having a sensor window on a surface thereof, the sensor window moving relative to a plane to perform data input function in the first mode; and a supporting member arranged on the surface of the main body for accommodating therein the input element, the input element moving relative to the sensor window to perform data input function in the second mode.

Preferably, the supporting member is detachably arranged on the surface of the main body and disposed over the sensor window in the second mode.

In one embodiment, the supporting member is separable from the main body in the first mode, and secured onto the surface of the main body in the second mode. Preferably, the dual mode input device further comprises a securing member for securing the supporting member onto the surface of the main body.

In one embodiment, the securing member comprises a plurality of positioning holes arranged on the surface of the main body around the sensor window; and a plurality of pins coupled to the supporting member and having positions corresponding to the plurality of positioning holes, respectively, the plurality of pins being inserted into the plurality of positioning holes to secure the supporting member onto the surface of the main body over the sensor window in the second mode. The plurality of pins can be integrally formed with the supporting member.

Preferably, the supporting member substantially has a hollow semi-spherical shape.

In one embodiment, the securing member is a sucker disc coupled to the supporting member, and attached onto the surface of the main body by a sucking force so as to secure the supporting member onto the surface of the main body over the sensor window in the second mode. Preferably, the sucker disc is transparent and coupled to the supporting member to serve as a bottom surface of the supporting member. The sucker disc can be integrally formed with the supporting member.

Preferably, the supporting member substantially has a hollow cylindrical shape.

In one embodiment, the supporting member is pivotally connected to the surface of the main body, and pivoted to hide inside the main body in the first mode and sit over the sensor window in the second mode.

Preferably, the main body has a space therein, the supporting member includes a first portion for accommodating therein the input element, and a second portion pivotally secured to the surface and connected to the first portion for moving the first portion between a first position over the sensor window and a second position inside the space, thereby switching data input function between the second and the first mode, respectively. The first and the second portions of the supporting member can be integrally formed.

Preferably, the first and the second portions are configured to have a surface of the first portion at the first position substantially parallel to the surface of the main body, and have the first portion at the second position substantially completely hidden inside the space.

Preferably, the main body comprises a lid covering the opening of the space to prevent the first portion at the second position from escaping from the opening.

Preferably, the input element is a trackball, and the first portion includes a ring for receiving the trackball therein.

Preferably, the first portion includes a plurality of posts connected to the ring for supporting the trackball to sit over the sensor window.

Preferably, the input element is hidden inside the main body along with the supporting member in the first mode.

The input device, for example, is an optical mouse in the first mode and an optical trackball in the second mode.

If the input element is a trackball, it is rotated to move relative to the sensor window to perform a data input function in the second mode.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1A:
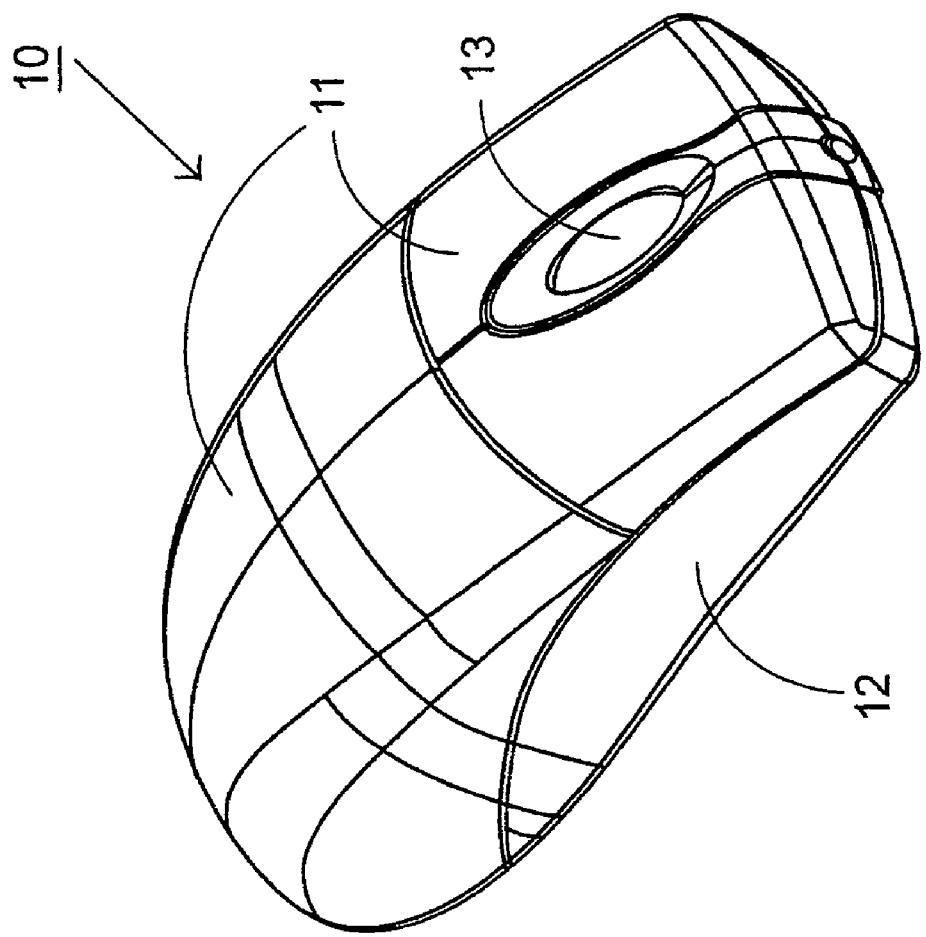
FIGS. 1A and 1B are a top and a bottom perspective views of a typical optical mouse shown schematically.
Figure 1B:
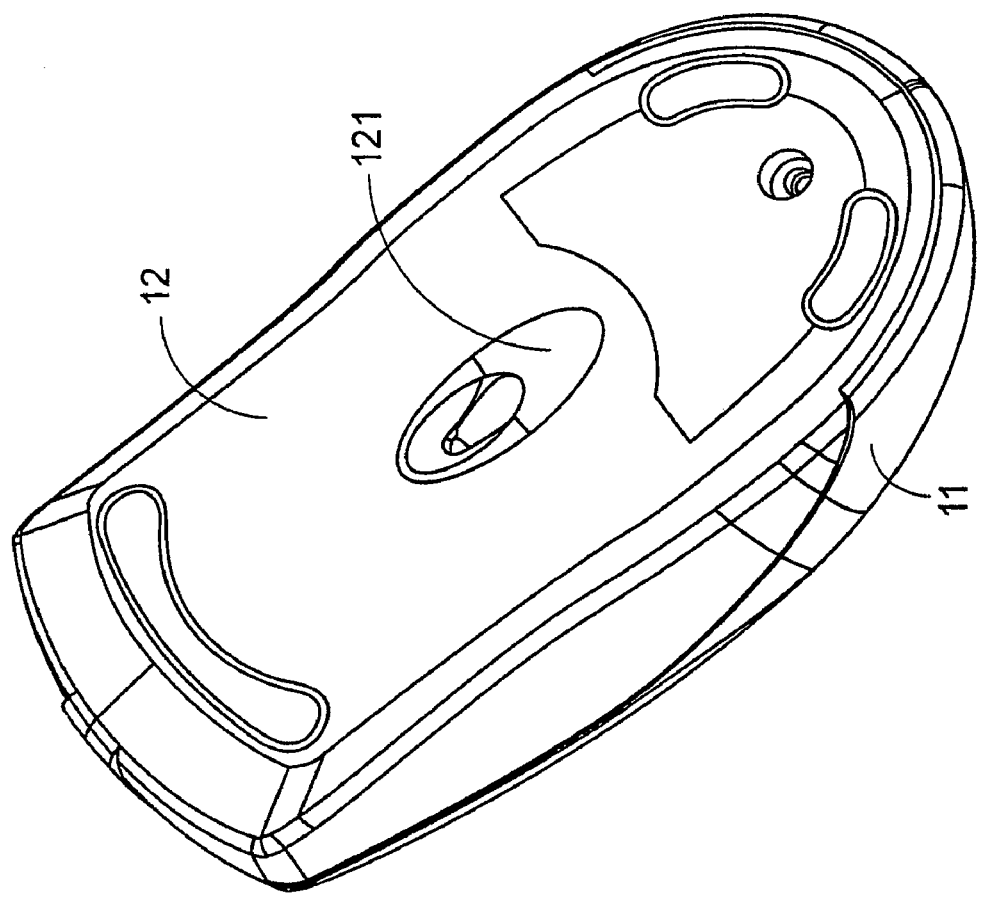
Figure 2A:
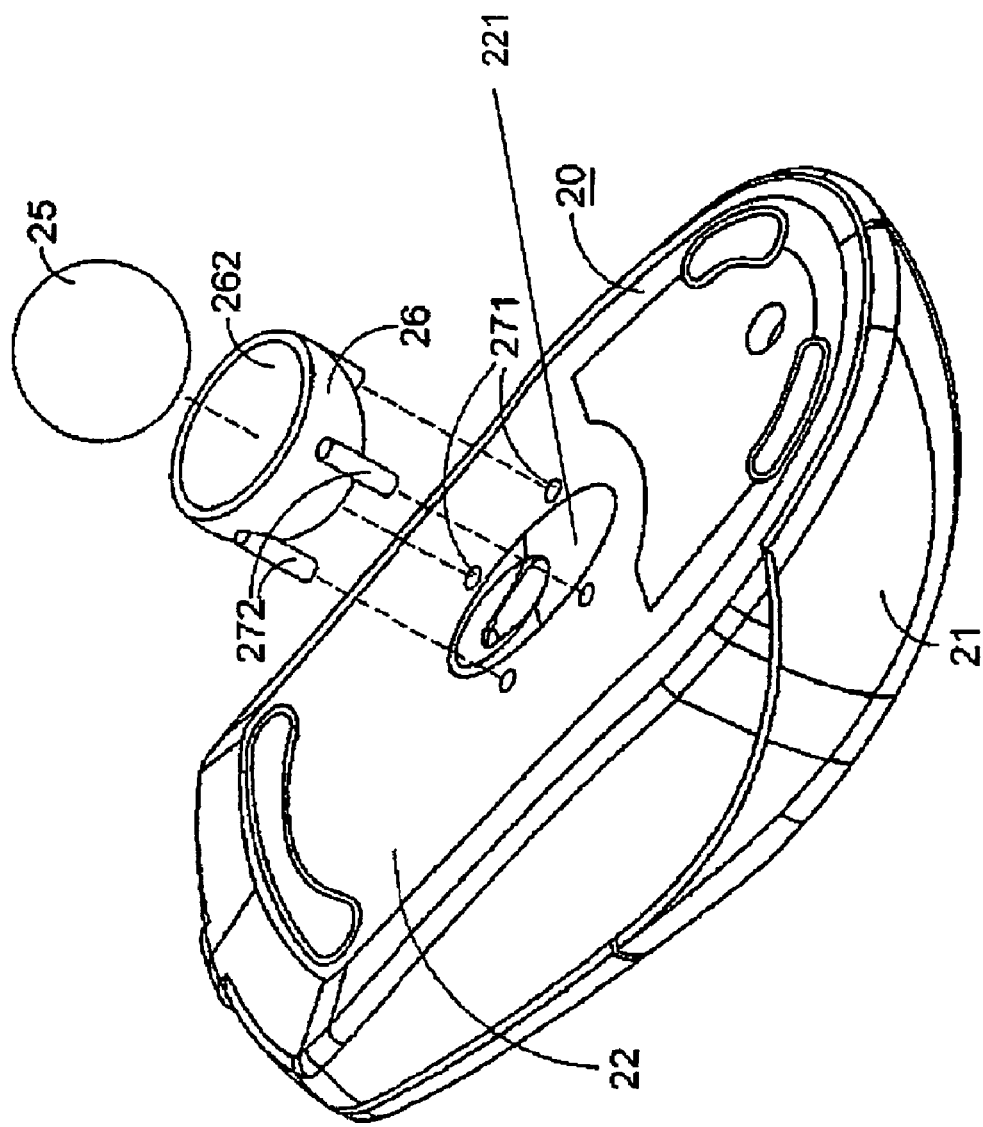
FIGS. 2A and 2B are a partially resolving and an assembling diagrams schematically showing the bottom perspective view of a dual mode input device according to a first embodiment of the present invention.
Figure 2B:
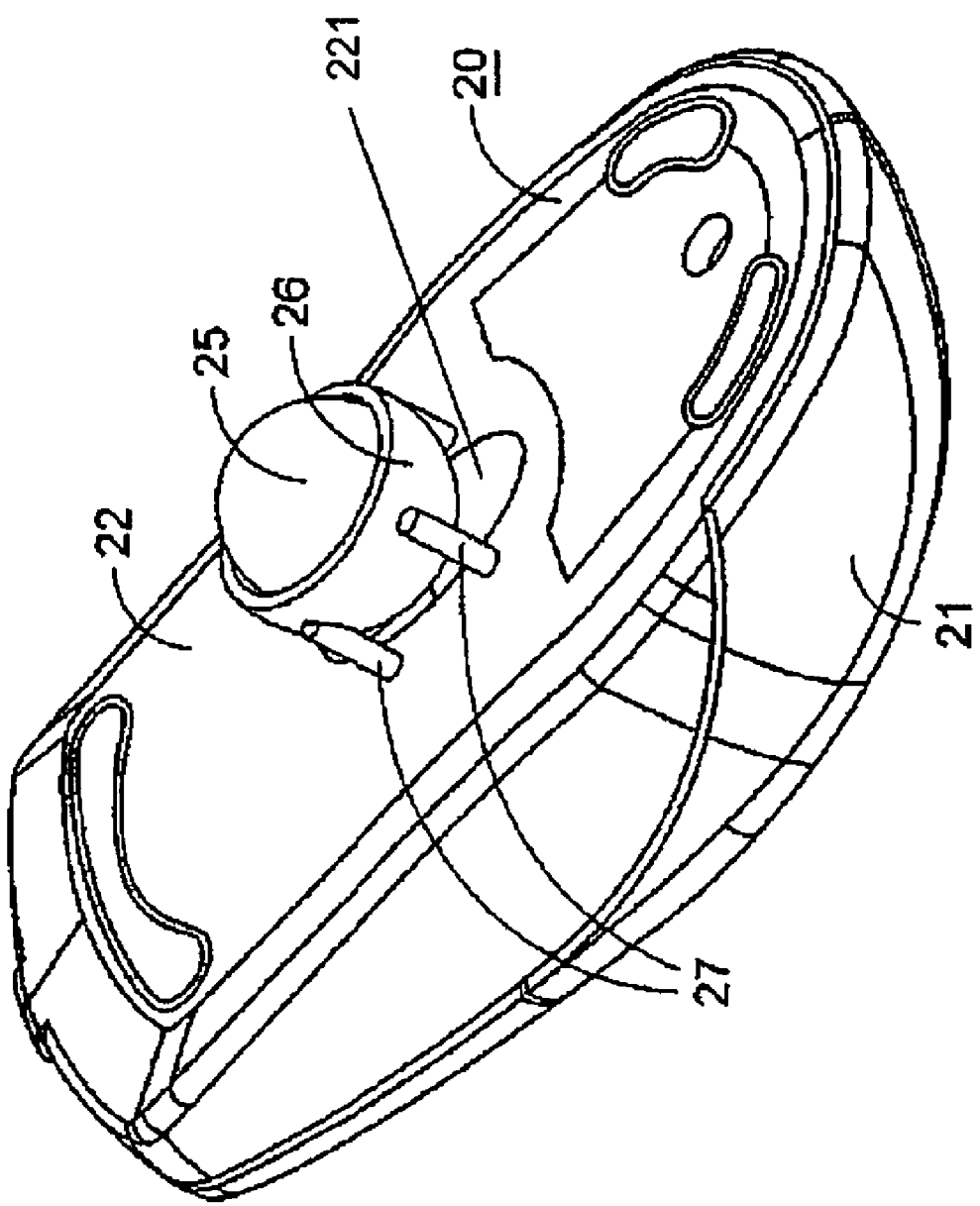

Referring to FIGS. 2A and 2B, a first embodiment of a dual mode input device according to the present invention is disclosed. The dual mode input device is capable of performing a data input function by moving the input device like an optical mouse, or performing a data input function by manipulating an element without movement of the input device, like an optical trackball. The dual mode input device comprises a main body 20 for accommodating therein a photo-sensor circuit (not shown), a supporting member 26 for receiving therein the input element such as a trackball, and a securing member 27 for securing the supporting member 26 to the main body 20.

The main body 20 consists of an upper housing 21 and a lower housing 22 and has a photo-sensor window 221 on the lower housing for 22 for exposing the photo-sensor circuit. When the input device is placed on a certain plane (not shown) with the lower housing 22 in contact with the certain plane, the photo-sensor circuit detects the texture variation of the certain plane, and generates a cursor indication signal accordingly. On the other hand, when the input device is to perform data input function without moving the main body 20, the main body 20 is turned upside down, i.e. the lower housing 22 is oriented upwards to be accessible by the user. Meanwhile, the photo-sensor window 221 is oriented upwards to expose the photo-sensor circuit. By attaching the supporting member 26 onto the facing-up lower housing 22 via the securing member 27, and having the input element 25 received by the supporting member 26 disposed over and moved relative to the photo-sensor window 221, the photo-sensor circuit detects the change of texture of the input element to perform data input function.

In this embodiment, the input element 25 is exemplified as a trackball. Therefore, the supporting member 26 preferably has a smooth and concave inner surface for allowing the trackball 25 resting thereon to smoothly rotate. The supporting member 26, for example, has a hollow semi-spherical shape. A plurality of pins 272 are provided around the supporting member 26 by for example integral formation. The pins 272 are inserted into a plurality of corresponding positioning holes 271 arranged around the photo-sensor window 221 to form the securing member 27 to secure the supporting member 26 onto the lower housing 22. By manipulating the trackball 25 in the supporting member 26 to rotate, the photo-sensor circuit will detect the texture change of the trackball 25, thereby providing a cursor indication signal and achieving the purpose of data input. Of course, when the optical mouse mode is to be performed again, the pins 272 and the supporting member 26 with the trackball 25 are detached from the positioning holes 271, and the main body 20 is returned to its original condition, i.e. the lower housing 22 is turned to face down.

Figure 3:
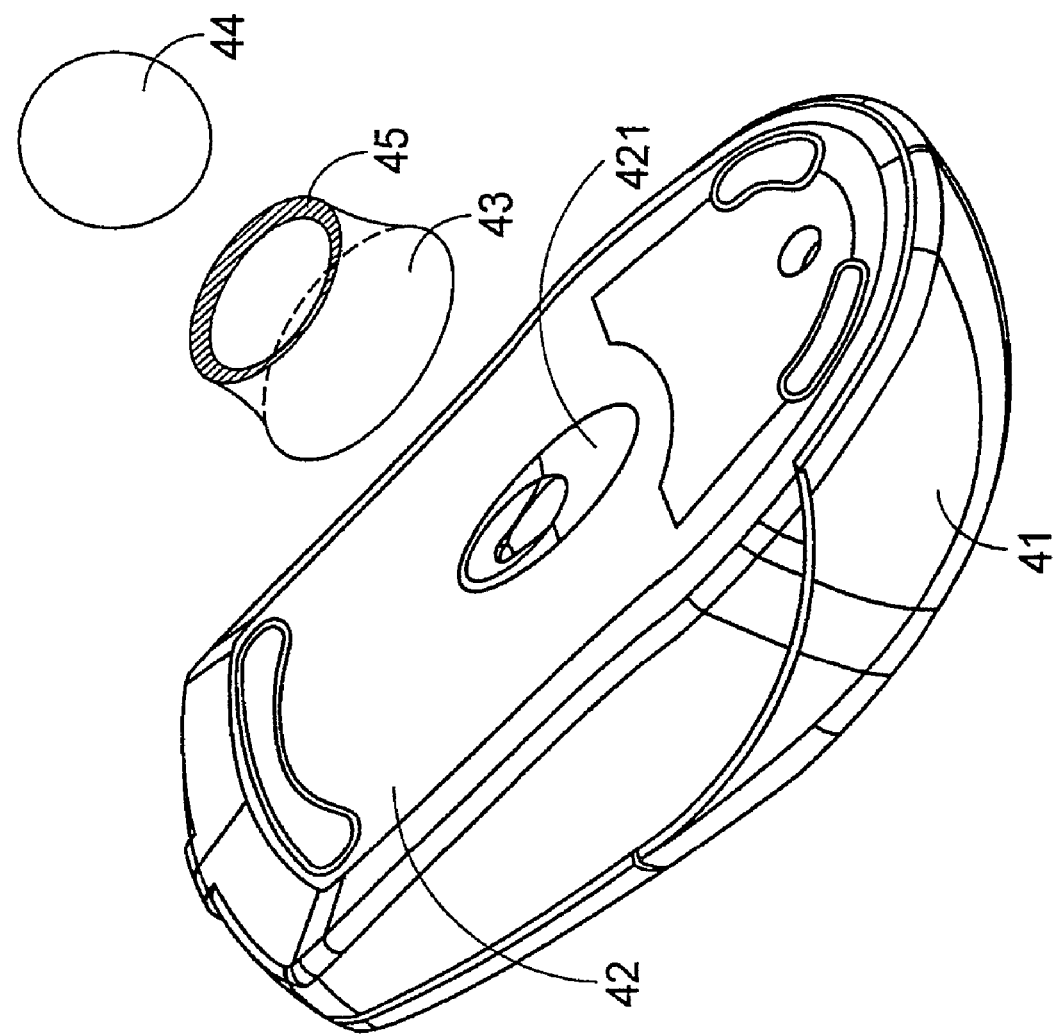
FIG. 3 is a resolving diagram schematically showing the bottom perspective view of a dual mode input device according to a second embodiment of the present invention.

Another embodiment of the dual mode input device according to the present invention will be illustrated hereinafter with reference to FIG. 3. In this embodiment, the dual mode input device is similar to that of FIGS. 2A and 2B except that the supporting member 45 has a hollow cylinder-like shape and the securing member 43 is a transparent sucker disc arranged as the bottom surface of the hollow cylinder-like supporting member 45. Via a sucking force of the sucker disc 43, the supporting member 45 can be attached onto the lower housing 42 over the photo-sensor window 421 when the optical trackball mode is to be performed. The input element such as the trackball 44 is then placed in the supporting member 45 to be manipulated. The hollow cylinder-like supporting member 45, for example, can be integrally formed with the sucker disc 43.

Figure 4A:
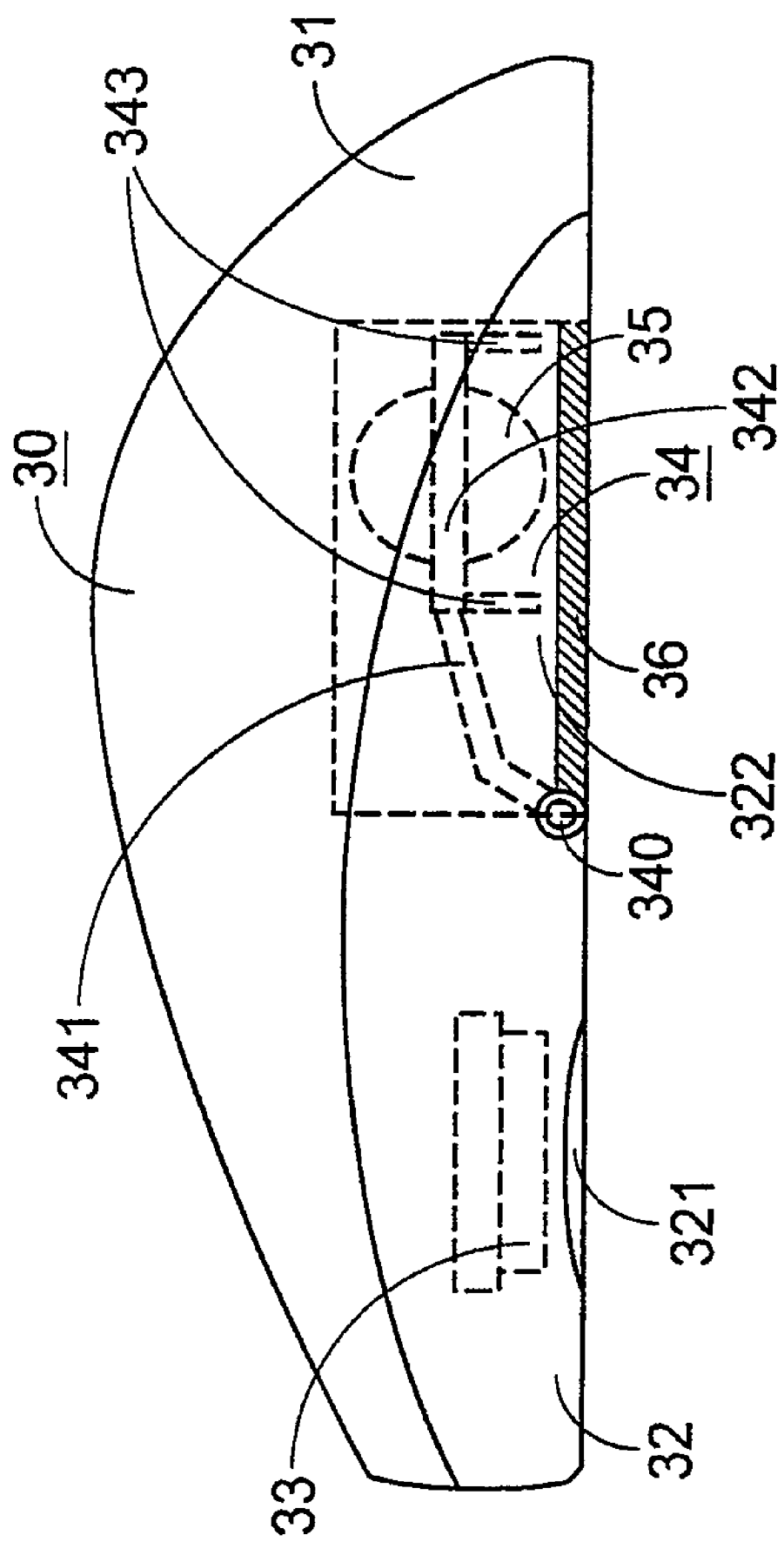
FIGS. 4A and 4B are side views of a dual mode input device according to a second embodiment of the present invention, schematically showing the switching operation between two data input modes.
Figure 4B:
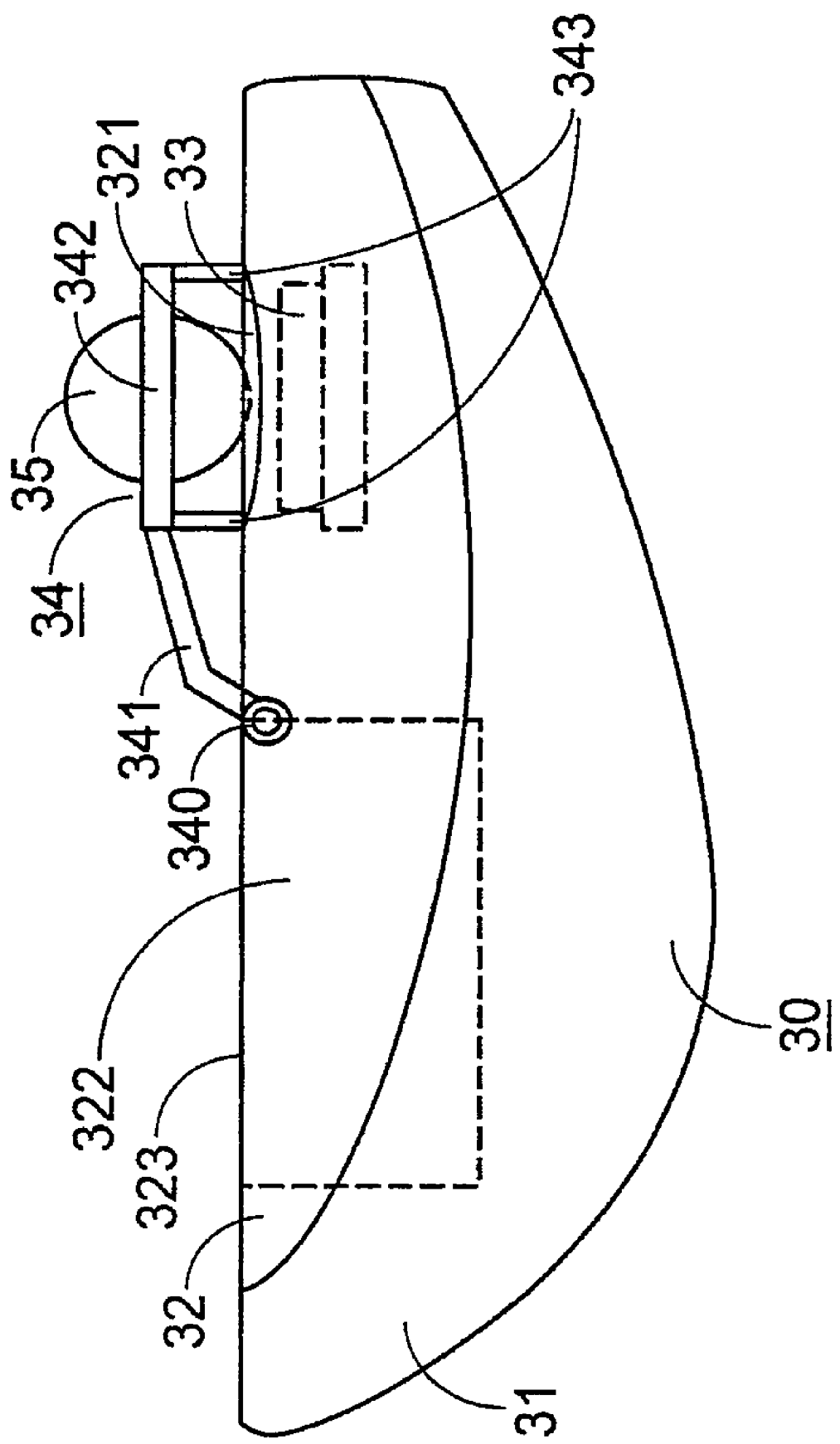

Further referring to FIGS. 4A and 4B, a third embodiment of the dual mode input device according to the present invention is illustrated. An optical mouse mode and an optical trackball mode are also given as an example to describe the dual mode input device according to the present invention. In this embodiment, the dual mode input device comprises a main body 30 for accommodating therein a photo-sensor circuit 33, and a supporting member 34 for receiving therein the input element such as a trackball 35.

The main body 30 consists of an upper housing 31 and a lower housing 32 and has a photo-sensor window 321 on the lower housing 32 for exposing the photo-sensor circuit 33. When the input device is placed on a certain plane (not shown) with the lower housing 32 in contact with the certain plane, the photo-sensor circuit 33 detects the texture variation of the certain plane, and generates a cursor indication signal accordingly. On the other hand, when the input device is to perform data input function without moving the main body 30, the main body 30 is turned upside down, i.e. the lower housing 32 is oriented upwards to be accessible by the user. Meanwhile, the photo-sensor window 321 is oriented upwards to expose the photo-sensor circuit 33. By attaching the supporting member 34 onto the facing-up lower housing 32, and having the trackball 35 received by the supporting member 34 disposed over and moved relative to the photo-sensor window 321, the photo-sensor circuit 33 detects the change of texture of the trackball 35 to perform the data input function.

The supporting member 34 in this embodiment is configured to allow the trackball 35 to rest thereon and smoothly rotate. The supporting member 34 can be hidden inside the main body 30 when the optical mouse mode is in use, as shown in FIG. 4A, and disposed over the optical-sensor window 321 when the optical trackball mode is in use, as shown in FIG. 4B. The trackball 35 can be hidden inside the space 322 between the upper housing 31 and the lower housing 32 along with the supporting member 34. Alternatively, the trackball 35 can be put in the supporting member 34 only when it is to be used. In order to achieve the purpose of easy switching between two modes, the supporting member 34 is pivotally connected to the lower housing 32 about a fulcrum 340. In the optical trackball mode, the supporting member 34 is pivoted from the space 322 to the position on the lower housing 32 over the optical sensor window 321. By manipulating the trackball 35 in the supporting member 34 to rotate, the photo-sensor circuit 33 will detect the texture change of the trackball 35, thereby providing a cursor indication signal and achieving the purpose of data input. Of course, when the optical mouse mode is to be performed, the supporting member 34 is pivoted from the position on the lower housing 32 to the position in the space 322 with or without the trackball detached from the supporting member 34. Further, the main body 30 is returned to its original condition, i.e. the lower housing 32 is turned to face down.

The supporting member 34 includes a first arm portion 341 connected to the pivot fulcrum 340 and a second arm portion 342 coupled to the first arm portion 341. The second arm portion 342 preferably has a ring shape for receiving therein the trackball 35, and is arranged therearound a plurality of posts 343 for facilitating the ring 342 to stably sit over the optical-sensor window 321. The portions 341 and 342 and the posts 343 can be integrally formed. More preferably, a lid 36 is used to cover the opening 323 of the space 322 in order that the supporting member 34 and the trackball 35 will not drop out of the space 322 from the opening 323. The first and the second arm portions 341 and 342 are preferably configured to have the second arm portion, i.e. the ring 342, sitting over the optical-sensor window 321 substantially parallel to the lower housing face in the optical trackball mode, and have the ring 342 substantially completely hidden in the space 322 in the optical mouse mode.

From the above description, it is understood that two data input modes can be optionally performed by the presence of the supporting member and securing member. The assembling and operation of the supporting member is easy so that it is convenient to switch data input modes according to practical needs.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A dual mode input device for performing a data input function by a moving action in a first mode, and performing the data input function by a manipulating operation on an input element in a second mode, comprising:
   a main body having a sensor window at a surface thereof, said sensor window being movable relative to a plane to perform the data input function in said first mode; and
   a supporting member configured for placement at said surface of said main body to accommodate therein said input element, wherein said input element is configured to rotate to perform the data input function in said second mode, and the supporting member is configured to move relative to the main body.

2. The dual mode input device according to claim 1 wherein said supporting member is detachably arranged on said surface of said main body and disposed over said sensor window in said second mode.

3. The dual mode input device according to claim 2 further comprising a securing member for securing said supporting member onto said surface of said main body.

4. The dual mode input device according to claim 3 wherein said securing member comprises:
   a plurality of positioning holes arranged on said surface of said main body around said sensor window; and
   a plurality of pins coupled to said supporting member and having positions corresponding to said plurality of positioning holes, respectively, said plurality of pins being inserted into said plurality of positioning holes to secure said supporting member onto said surface of said main body over said sensor window in said second mode.

5. The dual mode input device according to claim 3 wherein said securing member is a sucker disc coupled to said supporting member, and attached onto said surface of said main body by a sucking force so as to secure said supporting member onto said surface of said main body over said sensor window in said second mode.

6. The dual mode input device according to claim 1, wherein said main body has a space therein, said supporting member includes a first portion for accommodating therein said input element, and a second portion pivotally secured to said surface and connected to said first portion for moving said first portion between a first position over said sensor window and a second position inside said space, thereby switching data input function between said second and said first mode, respectively.

7. The dual mode input device according to claim 6 wherein said input element is a trackball, and said first portion includes a ring for receiving said trackball therein.

8. The dual mode input device according to claim 7 wherein said first portion includes a plurality of posts connected to said ring for supporting said trackball to sit over said sensor window.

9. The dual mode input device according to claim 1, wherein said input element is hidden inside said main body along with said supporting member in said first mode.

10. The dual mode input device according to claim 1 wherein said input device is an optical mouse in said first mode and an optical trackball in said second mode.

11. The dual mode input device according to claim 10 wherein said input element is a trackball and rotated to move relative to said sensor window to perform the data input function in said second mode.

12. A method for changing a configuration of a dual mode input device from a first mode to a second mode, comprising:
   coupling an input element to a supporting member; and
   moving the supporting member from a first position to a second position, wherein when the supporting member is in the second position the supporting member is positioned over a sensor window disposed on a surface of a main body of the dual mode input device, and a position of the supporting member relative to the sensor window is different when the supporting member is in the second position than when the supporting member is in the first position.

13. The method of claim 12, further comprising performing a data input function in the first mode by moving the sensor window relative to a plane.

14. The method of claim 12, further comprising performing a data input function in the second mode by moving the input element relative to the sensor window.

15. The method of claim 12, further comprising:
   securing the supporting member onto the surface of the main body while the supporting member is in the second position.

16. The method of claim 15, wherein securing the supporting member comprises:
   inserting a plurality of pins coupled to the supporting member into a plurality of positioning holes arranged on the surface of the main body around the sensor window.

17. The method of claim 15, wherein securing the supporting member comprises:
   coupling a sucker disc to the supporting member; and
   attaching by a sucking force the sucker disc onto the surface of the main body over the sensor window.

18. The method of claim 12, further comprising:
   pivotally connecting the supporting member capable of accommodating therein the input element to the surface of the main body while the supporting member is in the second position.

19. The method of claim 18, further comprising:
pivoting the supporting member to hide the input element inside the main body in the first mode; and
pivoting the supporting member to position the input element over the sensor window in the second mode.

20. A dual mode input device, comprising:
means for enabling a user to perform a data input function in a first mode by moving relative to a plane a sensor window disposed on a surface of a main body of the dual mode input device; and
means for enabling the user to perform the data input function in a second mode by rotating an input element relative to the sensor window.

21. The dual mode input device of claim 20, further comprising:
means for arranging the input element on the surface of the main body and disposed over the sensor window.

22. The dual mode input device of claim 21, wherein the means for arranging the input element is separable from the main body in the first mode, and secured on the surface of the main body in the second mode.

23. The dual mode input device of claim 20, further comprising:
means for securing the input element onto the surface of the main body.

24. The dual mode input device of claim 23, wherein the means for securing the input element comprises:
means for hiding the input element inside the main body in the first mode; and
means for positioning the input element over the sensor window in the second mode.

25. A method for operating a dual mode input device comprising:
moving a sensor window disposed on a surface of a main body of a dual mode input device relative to a plane to perform a data input function in a first mode;
arranging a supporting member proximate the sensor window, the supporting member accommodating an input element and being configured to move relative to the sensor window; and
rotating the input element to perform the data input function in a second mode.

26. The method of claim 25, further comprising securing the supporting member to the surface of the main body, wherein securing the supporting member to the surface of the main body includes:
inserting a plurality of pins coupled to the supporting member into a plurality of positioning holes arranged on the surface of the main body; or
attaching a sucker disc included in the supporting member to the surface of the main body by a sucking force.

27. The method of claim 25, wherein the supporting member is pivotally connected to the main body, the method further comprising:
pivoting the supporting member to hide the input element inside a space formed in the main body for operation in the first mode; and
pivoting the supporting member to position the input element over the sensor window for operation in the second mode.

28. The method of claim 25, further comprising placing the input element in the supporting member prior to moving the input element relative to the sensor window.

* * * * *